United States Patent Office 3,674,368
Patented July 4, 1972

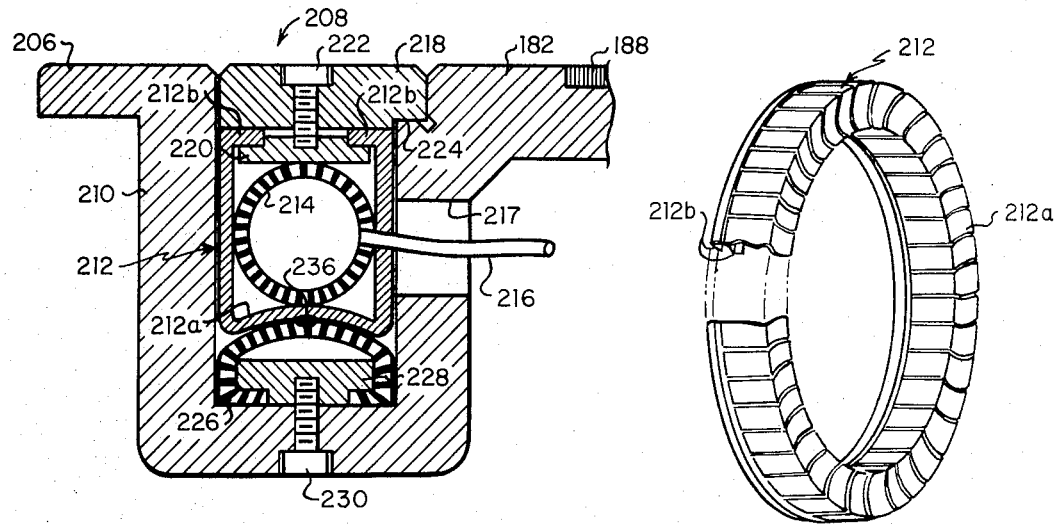
FIGURE 2
FIGURE 3
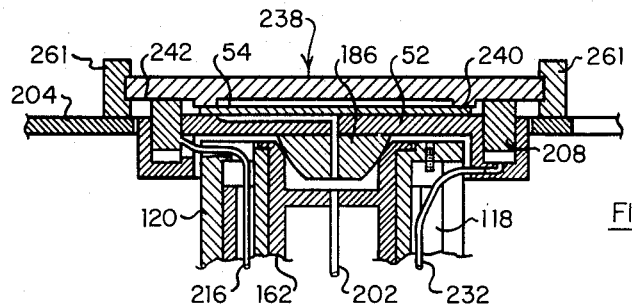
FIGURE 8
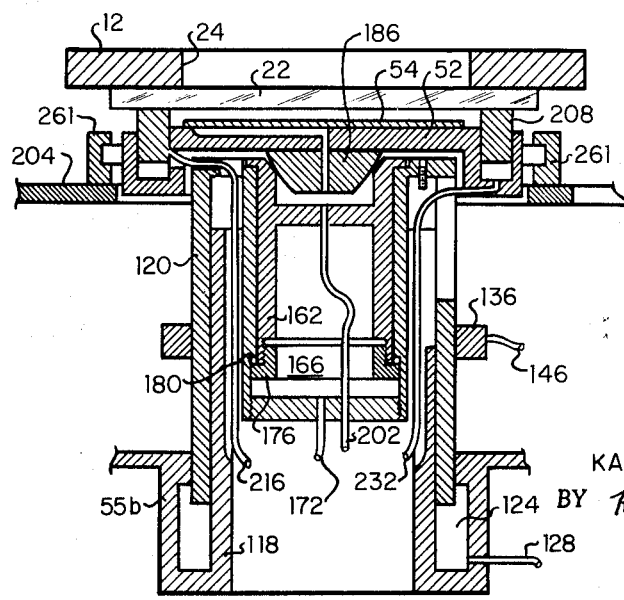
FIGURE 9

3,674,368
OUT OF CONTACT OPTICAL ALIGNMENT AND EXPOSURE APPARATUS
Karl-Heinz Johannsmeier, 555 W. Middlefield Road, Mountain View, Calif. 94040
Filed May 11, 1970, Ser. No. 36,174
Int. Cl. G03b 27/02
U.S. Cl. 355—78          35 Claims

ABSTRACT OF THE DISCLOSURE

A calibrator is retractably positioned between a mask-bearing holder and a wafer-bearing chuck positioned beneath the holder and provided wtih a peripheral locking ring structure that may be retractably driven upward above the upper surface of the wafer and locked in place. The locking ring structure includes an expandable generally U-shaped locking ring with an inwardly curved bottom wall that is forced outward by an inflatable tube to expand the side walls of the locking ring into locking engagement with a peripheral portion of the chuck. A first piston drives the chuck upward to position a peripheral portion of the upper surface of the wafer in abutment upon a first portion of the calibrator. The locking ring structure of the chuck is driven further upward into abutment upon a second portion of the calibrator, which is inwardly offset from the first portion by a selected distance, and locked in place. Next, the chuck is lowered and the calibrator retracted from between the chuck and the holder. The chuck is then driven upward again by the first piston to position the locking ring structure of the chuck in abutment upon a marginal portion of the lower surface of the mask and thereby establish parallel plane alignment between the upper surface of the wafer and the lower surface of the mask without bringing the wafer into contact with the mask. At this point, the first piston is locked in place and the locking ring structure of the chuck released and returned to its initial position to permit out of contact alignment of a pattern on the wafer with a pattern on the mask. After this alignment operation, the chuck is either retained in the alignment position or driven upward by a second piston to a position closer to the mask. A photosensitive film on the upper surface of the wafer may therefore be exposed through the mask while the wafer is in the alignment position or an elevated position closer to the mask. Following this exposure operation, the first piston is released and the chuck returned to its initial position. These out of contact alignment and exposure operations may also be accomplished without a calibrator or a chuck having a peripheral locking ring structure by employing a chuck having a peripheral spacing ring that may be driven upward a selected distance above the upper surface of a wafer positioned on the chuck.

BACKGROUND AND SUMMARY OF THE INVENTION

This invention relates generally to apparatus for aligning a semiconductor wafer with a photomask and exposing a photosensitive surface of the aligned wafer through the mask and, more particularly, to apparatus for performing these alignment and exposure operations without ever bringing the wafer into contact with the mask.

In most conventional optical alignment and exposure instruments for transferring a geometric pattern on a photomask to a semiconductor wafer, a photosensitive surface of the wafer and an adjacent pattern-bearing surface of the mask are initially brought into intimate contact to establish parallel plane alignment therebetween. The wafer and the mask are then separated to permit out of contact alignment of a pattern on the wafer with the pattern on the mask. After this pattern alignment operation, however, the photosensitive surface of the wafer and the pattern-bearing surface of the mask are again brought into intimate contact and so maintained during exposure of the photosensitive surface of the wafer through the mask. Optical alignment and exposure instruments of this type are shown and described, for example, in U.S. Pat. 3,192,-844 issued July 6, 1965 to Peter R. Szasz et al. and in U.S. Pat. 3,220,231 issued Nov. 30, 1965 to James A. Evans et al. The mechanical abrasion inevitably produced between the wafer and the mask in such optical alignment and exposure instruments may damage the photosensitive surface of the wafer and the pattern-bearing surface of the mask. Damaged or scratched areas on the pattern-bearing surface of the mask are especially undesirable since they will be reproduced on all wafers with which the mask is subsequently used.

Accordingly, it is the principal object of this invention to provide improved optical alignment and exposure apparatus for transferring a pattern on a photomask to a semiconductor wafer without ever bringing the wafer into contact with the mask.

Another object of this invention is to provide an improved chuck and piston drive therefor that may be used in this and other optical alignment and exposure apparatus.

Still another object of this invention is to provide an improved locking ring structure that may be used in this and other optical alignment and exposure apparatus.

These objects are accomplished according to one of the preferred embodiments of this invention by employing a pivotally-mounted chuck with a peripheral locking ring structure that may be retractably driven upward above the upper surface of a wafer supported on the chuck and that may pivot slightly when driven upward into abutment upon a reference surface making a slight angle with respect to the wafer bearing surface of the chuck to insure face-to-face abutment with the reference surface. The locking ring structure may include a generally U-shaped locking ring with its side and bottom walls slotted so that they may be resiliently expanded outward by an inflatable tube contained within the locking ring and with its bottom wall curved inward so that outward expansion of the bottom wall forces the side walls outward and into tight locking engagement with a peripheral portion of the chuck to lock the locking ring structure in place. A calibrator for spacing the upper surface of the locking ring structure a selected distance $x$ above the upper surface of the wafer is retractably mounted between the chuck and a mask-bearing holder positioned above the chuck. The calibrator includes a spacing portion positioned for abutment with a peripheral portion of the upper surface of the wafer in a first reference plane and surrounded by a reference portion inwardly offset for abutment with the upper surface of the locking ring structure of the chuck in a parallel second reference plane spaced the selected distance $x$ above the first reference plane. An annular step, a plurality of spaced pins, or an air cushion provided by a plurality of spaced air jets may be employed as the spacing portion of the calibrator and may be adjusted to alter the spacing between the parallel first and second reference planes. Similarly, a plane surface or an air cushion provided by a plurality of spaced air jets may be employed as the reference portion.

In operation, the chuck is driven upward by a first piston to position a peripheral portion of the upper surface of the wafer in face-to-face abutment upon the spacing portion of the calibrator in the first reference plane, and the locking ring structure of the chuck is driven further upward by fluid pressure into face-to-face abutment upon the inwardly offset reference portion of the calibrator in the parallel second reference plane. Since the chuck is pivotally mounted, this establishes parallel plane alignment of the upper surfaces of the locking ring structure and the wafer and spaces the upper surface of the locking ring structure the selected distance $x$ above the upper surface of the wafer. The locking ring structure is then locked in place, the chuck lowered, the calibrator retracted from between the chuck and the holder, and the chuck driven upward again by the first piston to position the upper surface of the locking ring structure in face-to-face abutment upon a marginal portion of the lower surface of the mask. This establishes parallel plane alignment of the upper surface of the wafer and the lower surface of the mask and spaces these surfaces apart by the selected distance $x$ without bringing the wafer into contact with the mask. The first piston is then locked in place and the locking ring structure of the chuck released and returned to its initial position to permit out of contact alignment of a pattern on the wafer with a pattern on the mask. After this pattern alignment operation, the chuck is either retained in the alignment position or driven upward by a second piston to an elevated position closer to the mask. A photosensitive film on the upper surface of the aligned wafer may therefore be exposed through the mask while the wafer is in the patern alignment position or in an elevated position closer to or in contact with the mask. Following this exposure operation, the first piston is released and the chuck returned to its initial position.

According to another of the preferred embodiments of this invention a pivotally-mounted chuck with a peripheral spacing ring that may be retractably driven upward a selected distance $x$ above the upper surface of a wafer supported on the chuck may be employed in lieu of a calibrator and a chuck with a peripheral locking ring structure to accomplish the above-mentioned out of contact alignment and exposure operations. In this case, the spacing ring of the chuck is driven upward the selected distance $x$ above the upper surface of the wafer by fluid pressure, and the chuck is then driven upward by a piston to position the spacing ring in face-to-face abutment upon a marginal portion of the lower surface of the mask. This establishes parallel plane alignment of the upper surface of the wafer and the lower surface of the mask and spaces these surfaces apart by the selected distance $x$ without bringing the wafer into contact with the mask. The piston is then locked in place and the spacing ring of the chuck returned to its initial position to permit out of contact alignment of a pattern on the wafer with a pattern on the mask followed by out of contact exposure of a photosensitive film on the upper surface of the wafer through the mask in the same manner as described above.

Other and incidental objects of this invention will become apparent from a reading of this specification and an inspection of the accompanying drawings.

DESCRIPTION OF THE DRAWINGS

FIG. 2 is a cross-sectional view of the locking ring structure employed in the chuck of FIG. 1.

FIG. 3 is a cutaway perspective view of the locking ring employed in the locking ring structure of FIGS. 1 and 2.

FIG. 8 is a simplified representation of the chuck and calibrator of FIG. 1, as viewed in a plane orthogonal to that of FIG. 1, when the chuck is in the calibration position.

FIG. 9 is a simplified representation of the optical alignment and exposure system of FIG. 1, as viewed in a plane orthogonal to that of FIG. 1, when the chuck is in the alignment position.

DESCRIPTION OF THE PREFERRED EMBODIMENTS

Figure 1:
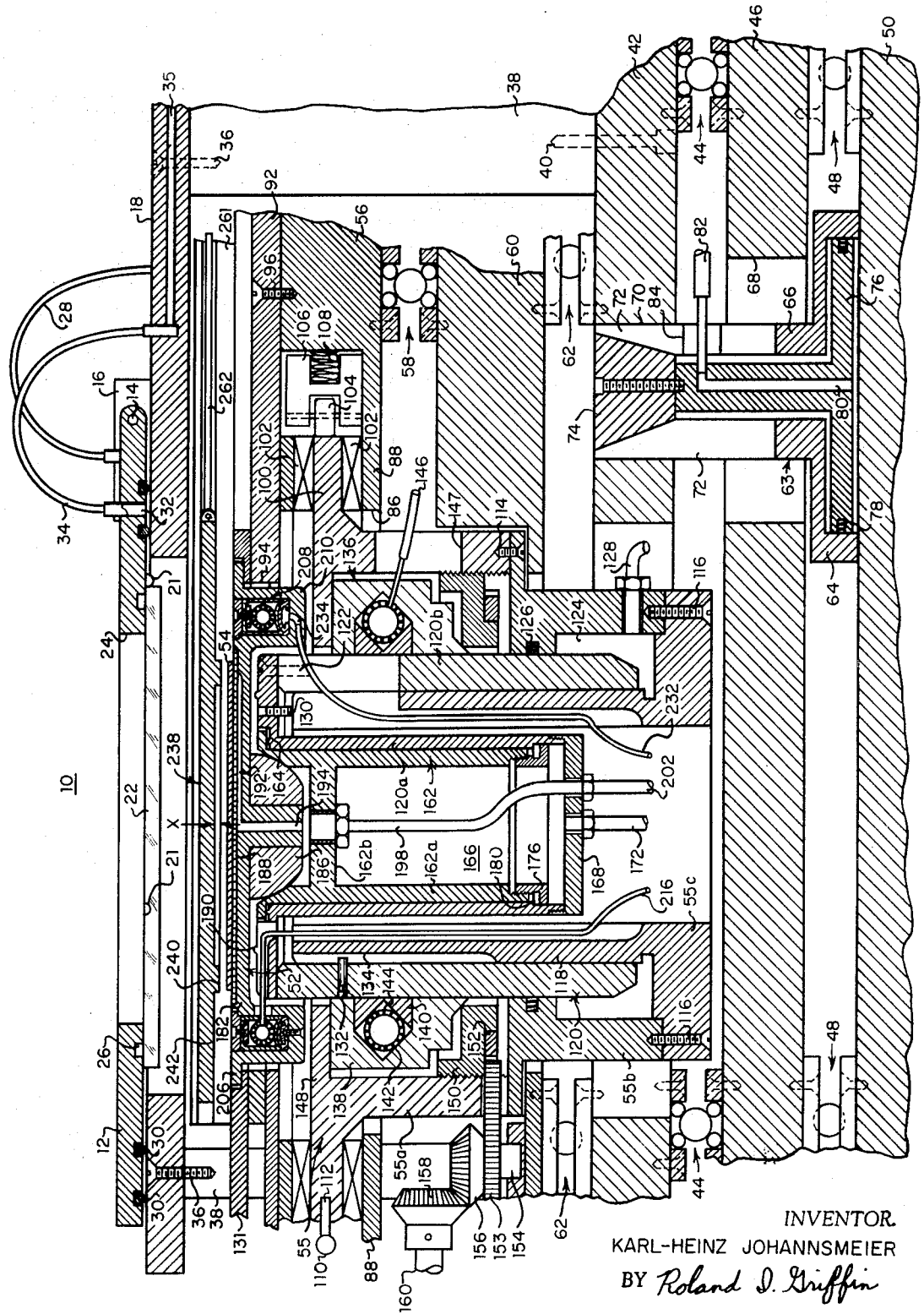
FIG. 1 is a half-sectional side view of an optical alignment and exposure system according to one of the preferred embodiments of this invention, when the chuck is in the initial wafer loading and unloading position.

Referring now to FIG. 1, there is shown an optical alignment and exposure system 10, which, except as differently set forth herein, may be constructed and operated, for example, in the same manner as the system shown and described in detail in U.S. Pat. 3,490,846 entitled Optical Alignment and Exposure Apparatus, filed June 1, 1967, by Goetz H. Kasper, and issued Jan. 20, 1970. Optical alignment and exposure system 10 includes a mask holder 12 pivotally mounted on a pin 14 extending between a pair of spaced blocks 16 secured to a top plate 18. Mask holder 12 may therefore be pivoted about the axis of pin 14 between a raised mask loading and unloading position and a lowered operative position when the optical unit 20 (see FIG. 10) of the system is raised, as described in connection with FIG. 3 of U.S. Pat. 3,490,846.

Locating lugs 21 extend from the bottom of mask holder 12 for locating a photomask 22, which is made of glass or some other transparent material with a desired geometric pattern formed on its lower surface, at an aperture 24 extending through the mask holder. Mask 22 is held in place on mask holder 12 by drawing a vacuum through a groove 26 formed in the lower surface of mask holder 12 around aperture 24 and covered by the mask. This is accomplished by connecting groove 26 through a passageway in the mask holder, a flexible tube 28, and a first normally open solenoid-operated valve to a vacuum source. As shown and described in connection with FIG. 11 of U.S. Pat. 3,490,846, the first normally open solenoid-operated valve may be actuated to interrupt the vacuum connection to groove 26, and thereby release mask 22 from mask holder 12, by a microswitch that is activated by the mask holder in the raised mask loading and unloading position.

A pair of concentric resilient seal rings 30 are positioned in grooves formed in the lower surface of mask holder 12 around groove 26. In the lowered operative position of mask holder 12, these seal rings sealingly engage the upper surface of top plate 18. Mask holder 12 may therefore be urged into tight engagement with top plate 18 by drawing a vacuum between seal rings 30. This is accomplished by connecting the area between seal rings 30 through a passageway 32 in the mask holder, a flexible tube 34, a passageway 35 in top plate 18, and a second normally open solenoid-operated valve to the vacuum source. The second normally open solenoid-operated valve may be actuated to interrupt the vacuum connection between seal rings 30, and thereby release mask holder 12 from top plate 18, by another microswitch that is activated when optical unit 20 (see FIG. 10) of the system is raised so that mask holder 12 may be pivoted to the raised mask loading and unloading position.

Top plate 18 on which mask holder 12 is mounted is attached by screws 36 to posts 38, which are in turn secured by screws 40 to a horizontally movable platform 42. This platform is horizontally reciprocally mounted by bearing supports 44 on an intermediate plate 46, which itself is horizontally reciprocally mounted by bearing supports 48 on a stationary base plate 50. Bearing supports 44 and 48 are oriented at right angles to one another so that platform 42 and intermediate plate 46 may be driven by a hand-operated lever arrangement, as described in connection with FIGS. 11 and 12 of U.S. Pat. 3,490,846, to move top plate 18 and, hence, mask holder 12 in any horizontal direction relative to stationary base plate 50.

Optical alignment and exposure system 10 also includes a vacuum chuck 52 for supporting a semiconductor wafer 54 to be aligned with mask 22. Vacuum chuck 52 is positioned beneath mask holder 12 and is supported by a generally annular-shaped chuck holder 55 on another horizontally movable platform 56. This platform is horizontally reciprocally mounted by bearing supports 58 on another intermediate plate 60, which itself is horizontally reciprocally mounted by bearing supports 62 on platform 42. Bearing supports 58 and 62 are oriented at right angles to one another so that platform 56 and intermediate plate 60 may be driven by a hand-operated lever arrangement, as described in connection with FIGS. 11 and 13-14 of U.S. Pat. 3,490,846, to move chuck holder 55 and, hence, vacuum chuck 52 in any horizontal direction relative to platform 42 and mask holder 12 mounted thereon. This permits horizontal movement of wafer 54 relative to mask 22 to align a pattern on the upper surface of the wafer with the pattern on the lower surface of the mask.

Releasable locking apparatus 63, like that described in connection with FIG. 11 of U.S. Pat. 3,490,846, normally locks platform 42 against movement relative to stationary base plate 50 to facilitate alignment of the pattern on the upper surface of wafer 54 with the pattern on the lower surface of mask 22. This releasable locking apparatus comprises a cylinder 64 with an open bottom resting upon stationary base plate 50 and with a sleeve 66 extending upwardly through an enlarged clearance hole 68 intermediate plate 46 and into a hole 70 in platform 42. Sleeve 66 is provided with longitudinally extending slots 72 so that it may be expanded outward into tight engagement with the walls of hole 70 by a sleeve expanding head 74 attached to a piston 76 vertically reciprocally mounted within the cylinder. A peripheral seal ring 78 provides slidable fluid-tight engagement between cylinder 64 and piston 76. Thus, a vacuum may be drawn within cylinder 64 between the lower surface of piston 76 and the upper surface of stationary base plate 50 to urge the cylinder into locking engagement with the stationary base plate and move the piston and attached head 74 downward, thereby expanding sleeve 66 into locking engagement with platform 42. This is accomplished by connecting cylinder 64 below piston 76 through a passageway 80 in the piston, a flexible tube 82 extending through an opening 84 in sleeve 66 of the cylinder, and a third normally open control valve to the vacuum source. As explained in connection with FIG. 11 of U.S. Pat. 3,490,846, the third normally open control valve may be actuated by the operator to vent tube 82 to the atmosphere and thereby release cylinder 64 from locking engagement with stationary base plate 50 and platform 42. This permits movement of mask holder 12 and vacuum chuck 52 together as a unit relative to stationary base plate 50 so that mask 22 and wafer 54 may be brought into the optical field of a microscope of optical unit 20 (see FIG. 10) without moving the ocular lens system 85 of the microscope.

In order to further facilitate alignment of the pattern on the upper surface of wafer 54 with the pattern on the lower surface of mask 22, vacuum chuck 52 is also made horizontally adjustable in a rotary direction about its vertical axis. This is accomplished in the same manner as described in connection with FIGS. 11 and 15 of U.S. Pat. 3,490,846 by providing platform 56 with an aperture 86 for receiving chuck holder 55 and with a radial flange 88 positioned at the lower end of this aperture for rotatably supporting the chuck holder. A plate 92 with an aperture 94 positioned in axial alignment with aperture 86 is secured to the top of platform 56 by screws 96. Plate 92 and flange 88 form an annular channel within which an outwardly directed radial flange 100 of chuck holder 55 is supported between thrust bearings 102 to rotatably support the chuck holder on platform 56. Chuck holder 55 is maintained in axial alignment with aperture 86 by three roller bearings mounted on platform 56 at spaced positions around radial flange 88. One of these roller bearings 104 is carried by a radially slidable block 106 that is resiliently biased by a spring 108 toward chuck holder 55 to urge roller bearing 104 into engagement with the chuck holder which, in turn, is urged into engagement with the other two roller bearings. A ball 110 is carried at the end of a pin 112 extending from flange 100 of chuck holder 55 so that fine and coarse rotatable adjustment of the chuck holder and, hence, vacuum chuck 52 may be accomplished by engagement of ball 110 between a pair of operator-controlled adjustably positionable push rods in the same manner as described in connection with FIG. 15 of U.S. Pat. 3,490,846.

Chuck holder 55 comprises an annular upper part 55a with radial flange 100, an annular intermediate part 55b with an outwardly directed radial flange positioned at its upper end and secured to upper part 55a by screws 114, and an annular lower part 55c attached to intermediate part 55b by screws 116. Lower part 55c has a cylindrical wall 118 that extends upward through intermediate and upper parts 55b and 55a at a spaced distance therefrom. A first piston 120 for supporting vacuum chuck 52 and driving it upward toward mask holder 12 is vertically reciprocally supported at the upper end of cylindrical wall 118. This piston comprises a hollow cylindrical part 120a coaxially positioned within cylindrical wall 118 at a spaced distance therefrom and provided with an outwardly directed radial flange that is positioned above the upper end of cylindrical wall 118 and secured by screws 122 to a sleeve-like part 120b telescopically surrounding cylindrical wall 118.

The first piston 120 and, hence, vacuum chuck 52 are raised by application of fluid pressure to an annular chamber 124 formed by an inwardly directed radial flange positioned at the upper end of intermediate part 55b of the chuck holder and provided with a peripheral seal ring 126 for providing slidable fluid-tight engagement of sleeve-like part 120b between this flange and cylindrical wall 118. Fluid pressure is applied to chamber 124 from a source of fluid pressure, such as compressed air, through a fourth control valve when opened by the operator, a flexible tube 128, and a fitting that extends through intermediate part 55b of the chuck holder. The first piston 120 and, hence, vacuum chuck 52 are lowered under the action of gravity by actuating this fourth control valve to disconnect tube 128 from the source of fluid pressure and vent it instead to the atmosphere. The fourth control valve may also be actuated to connect tube 128 to the source of vacuum and thereby facilitate the lowering of first piston 120 and vacuum chuck 52. One or more setscrews 130 extend through the upper end of the first piston 120 and abut upon the upper end of cylindrical wall 118 to prevent the first piston and vacuum chuck 52 from travelling downward beyond a lowered wafer loading and unloading position at which the upper surface of the vacuum chuck lies in the same plane as a top plate 131. A pin 132 also extends through one side of sleeve-like part 120b of the first piston and protrudes into an adjoining longitudinally extending groove 134 in cylindrical wall 118 of the chuck holder to prevent rotation of the first piston 120 and vacuum chuck 52 relative to the chuck holder as the first piston and vacuum chuck are raised and lowered.

Sleeve-like part 120b of the first piston is surrounded by a locking device 136, like that described in connection with FIG. 16 of U.S. Pat. 3,490,846, for releasably locking the first piston and, hence, vacuum chuck 52 in any vertical position to which they may be raised. Locking device 136 comprises a locking ring 138 coaxially positioned around sleeve-like part 120b, two or more locking ring sections 140 coaxially positioned around sleeve-like part 120b and within an annular groove 142 in the inner wall of locking ring 138, and a resilient inflatable tube 144 seated within groove 142 between a V-shaped bottom surface thereof and a V-shaped groove formed in the outer wall of locking ring sections 140. Inflatable tube 144 is connected through a flexible tube 146 and a fifth control valve to the source of fluid pressure. Thus, when the fifth control valve is opened by the operator, tube 144 is inflated and locking ring sections 140 urged radially inward into clamping engagement with sleeve-like part 120b of the first piston, thereby locking ring 138 to the first piston. This locks the first piston 120 and vacuum chuck 52 in whatever vertical position they are then in because locking ring 138 is fixedly engaged between an inwardly directed radial flange 148 of upper part 55a of the chuck holder and an externally-threaded stop ring 150 screwed into an internally-threaded lower portion of upper part 55a. The first piston 120 may be released by actuating the fifth control valve to vent tube 146 to the atomsphere, thereby deflating tube 144 and permitting vertical sliding movement of the first piston relative to locking device 136.

A ring gear 152 is attached to an inwardly offset lower portion of stop ring 150 and engaged by a spur gear 153 affixed to a rotatably mounted shaft 154. Shaft 154 is coupled through bevel gears 156 and 158 to another shaft 160 that extends out the front of the instrument. Thus, by turning shaft 160 the operator may unscrew stop ring 150 by an amount sufficient to permit vertical travel of locking device 136 between stop ring 150 and flange 148 of the chuck holder. Optical alignment and exposure system 10 may therefore be operated in the contact mode described in connection with FIG. 16 of U.S. Pat. 3,490,846, since there is sufficient frictional engagement between locking ring sections 140 of locking device 136 and sleeve-like part 120b of the first piston to prevent the locking device from sliding downwardly along the first piston under the force of gravity once it is moved upward with the first piston into abutment upon flange 148 of the chuck holder. During operation of optical alignment and exposure system 10 in the out of contact mode of the present invention, however, stop ring 150 is screwed into the lower portion of part 55a of the chuck holder until locking device 136 is fixedly positioned between and in abutment with stop ring 150 and flange 148.

A second piston 162 for supporting vacuum chuck 52 and driving it upward toward mask holder 12 is vertically reciprocally mounted within the first piston 120. The second piston 162 comprises a hollow cylindrical part 162a telescopically positioned within and in fluid-tight slidable abutment with cylindrical part 120a of the first piston. Cylindrical part 162a is provided with an outwardly directed radial flange at its upper end to prevent the second piston 162 and vacuum chuck 52 from travelling downward beyond the lowered wafer loading and unloading position at which the upper surfaces of the first and second pistons lie in the same plane and the upper surface of the vacuum chuck lies in the same plane as top plate 131. When the second piston 162 is in this lowered position, the outwardly directed radial flange of cylindrical part 162a rests upon an annular ridge formed along an offset inner peripheral portion 164 of the first piston 120. This annular ridge serves to prevent any dust particles, which might otherwise collect on the uppermost surface of offset portion 164 when the second piston 162 is raised, from interfering with return of the second piston to its lowered position.

The second piston 162 is raised by application of fluid pressure to a cylindrical chamber 166 formed between an end wall 162b positioned toward the upper end of cylindrical part 162a and an internally-threaded cap 168 screwed onto an externally-threaded lower end portion of cylindrical wall 120a of the first piston. Fluid pressure is applied to chamber 166 through a sixth control valve when opened by the operator, a flexible tube 172, and a fitting that extends through cap 168. The amount the second piston 162 may be raised and, hence, the amount vacuum chuck 52 may be raised by the second piston is limited by abutment of an externally-threaded annular stop ring 176, which is screwed into an internally-threaded lower end portion of cylindrical part 162a of the second piston, upon an offset lower portion 180 of cylindrical part 120a of the first piston. Stop ring 176 may be screwed further into or out of the threaded lower end portion of cylindrical part 162a to decrease or increase, respectively, the amount vacuum chuck 52 is raised by the second piston 162 and may even be screwed into fixed abutment upon offset lower portion 180 of cylindrical part 120 to prevent the vacuum chuck from being raised at all by the second piston. The second piston 162 and, hence, vacuum chuck 52 are lowered under the action of gravity by actuating the sixth control valve to disconnect tube 172 from the source of fluid pressure and instead vent it to the atmosphere. The sixth control valve may also be actuated to connect tube 172 to the source of vacuum and thereby facilitate the lowering of the second piston 162 and vacuum chuck 52.

As described in connection with FIG. 16 of U.S. Pat. 3,490,846, vacuum chuck 52 includes a chuck plate 182 with a central downwardly-extending stem secured to a bearing member 186, which is in the form of a section of a sphere. Bearing member 186 is seated in a conically-shaped inner peripheral part of the upper end portion of cylindrical part 162a so that the center of radius of bearing member 186 is located at substantially the center of a perforated top plate 188 concentrically mounted on the upper surface of chuck plate 182 and so that clearance space is provided between chuck plate 182 and an annular ridge 190 formed on the upper surface of the first piston 120. Vacuum chuck 52 may therefore pivot about its vertical axis in any horizontal direction as required for parallel plane alignment of the adjacent surfaces of wafer 54 and mask 22. Annular ridge 190 serves to prevent any dust particles, which might otherwise collect on the uppermost surface of the first piston 120, from interfering with the required pivotal movement of vacuum chuck 52.

A plurality of interconnected radial grooves 192 formed in the upper surface of chuck plate 182 are covered by perforated top plate 188. These grooves communicate with an axial bore 194 longitudinally extending through the stem of chuck plate 182. End wall 162b is also provided with an axial bore that communicates with bore 194 and that is connected through a fitting extending through end wall 162b, a flexible tube 198, another fitting extending through cap 168, another flexible tube 202, and a seventh control valve to the source of vacuum. Thus, once a wafer 54 is loaded onto vacuum chuck 52, it may be firmly held in place on perforated top plate 188 by opening the seventh control valve so that a vacuum is drawn through tube 202. The vacuum drawn through tube 202 also increases the frictional engagement between bearing member 186 and the conically-shaped inner peripheral portion of cylindrical part 162a. This frictional engagement is sufficient to maintain vacuum chuck 52 in whatever position it may be pivoted to during parallel plane alignment of the adjacent surfaces of wafer 54 and mask 22.

When a wafer 54 is to be loaded onto or unloaded from vacuum chuck 52, the seventh control valve is actuated to vent tube 202 to the atmosphere and thereby permit sliding movement of the wafer across perforated top plate 188 of the vacuum chuck. A wafer 54 may be loaded onto and unloaded from perforated top plate 188 of vacuum chuck 52 by moving the wafer along top plate 131 when the vacuum chuck is in its wafer loading and unloading position. This may be accomplished by employing a wafer loading and unloading mechanism like that described in connection with FIGS. 17–23 of U.S. Pat. 3,490,846. The wafer loading and unloading mechanism is rendered inoperative once vacuum chuck 52 is raised and is rendered operative again by a microswitch that is activated for this purpose by a peripheral flange 206 of chuck plate 182 when the vacuum chuck is returned to its wafer loading and unloading position.

An annular locking ring structure 208 is vertically reciprocally mounted within a general U-shaped peripheral portion 210 of chuck plate 182 around perforated top plate 188. As shown in FIGS. 1–3, locking ring structure 208 includes a generaly U-shaped locking ring 212 with its side and bottom walls slotted, as best shown in FIG. 3, so that they may be expanded outward by a resilient inflatable tube 214 contained therein. The bottom wall 212a of this locking ring is curved inward so that outward expansion of bottom wall 212a also forces the side walls of the locking ring outward with a substantially greater force than that exerted by inflatable tube 214. Bottom wall 212a therefore serves, in effect, as a force amplifier for converting the downwardly directed force exerted thereon by inflatable tube 214 into a substantially greater outwardly directed force upon the side walls of locking ring 212. The resultant outward expansion of the side walls of locking ring 212 by inflatable tube 214 and especially by outward expansion of inwardly curved bottom wall 212a clamps the locking ring in tight locking engagement with peripheral portion 210 of chuck plate 182. Inflatable tube 214 is connected through a flexible tube 216, which extends through an opening in one side wall of locking ring 212 and through a slot 217 in the adjoining portion of chuck plate 182, and an eighth control valve to the source of fluid pressure. Thus, when the operator opens the eighth control valve, tube 214 is inflated and the side walls of locking ring 212 are expanded outward into tight locking engagement with peripheral portion 210 of chuck plate 182, thereby locking the locking ring structure 208 in whatever vertical position it is then in. Locking ring structure 208 may be released by actuating the eighth control valve to vent tube 216 to the atmosphere, thereby deflating tube 214 and permitting vertical sliding movement of the locking ring structure relative to chuck plate 182.

Inwardly directed flanges 212b at the upper end of locking ring 212 are captivated between two rings 218 and 220 positioned on opposite sides of these flanges and secured together in abutment therewith by screws 222. A portion of the upper ring 218 abuts upon an offset portion 224 of chuck plate 182 to prevent locking ring structure 208 from travelling downward beyond a lowered inoperative position at which the upper surfaces of ring 218, chuck plate 182, and perforated top plate 188 lie in the same plane. Locking ring structure 208 may be raised above the upper surface of a wafer 54 supported on vacuum chuck 52 by applying fluid pressure to the lower side of a resilient inflatable seal 226, which is captivated at the bottom of peripheral portion 210 of the chuck plate by a plurality of retaining elements 228 secured to the bottom of peripheral portion 210 by screws 230. Fluid pressure is applied from the source of fluid pressure to the lower side of inflatable seal 226 through a ninth control valve when opened by the operator, a flexible tube 232, and a passageway 234 that communicates with the lower side of inflatable seal 226 between a pair of adjacent retaining elements 228. The upper side of seal 226 is attached to the bottom wall of locking ring 212 around the periphery thereof, as indicated at 236, so that locking ring structure 208 may be lowered by actuating the ninth control valve to disconnect tube 232 from the source of fluid pressure and vent it instead to the atmosphere or connect it to the source of vacuum. Sufficient clearance is provided between locking ring structure 208 and the adjacent wall of peripheral portion 210 of chuck plate 182 so that the locking ring structure may pivot slightly when driven upward into abutment upon a reference surface making a slight angle with respect to the wafer bearing surface of vacuum chuck 52. This insures face-to-face abutment of the upper surface of ring 218 and, hence, of locking ring structure 208 with the reference surface.

Optical alignment and exposure system 10 also includes a calibrator 238 for spacing the upper surface of locking ring structure 208 a selected distance $x$ of, for example, .0002 to .002 of an inch above the upper surface of a wafer 54 supported on vacuum chuck 52. Calibrator 238 comprises a square plate with a spacing structure 240 positioned on its lower surface for abutment with a peripheral portion of the upper surface of wafer 54 in a first reference plane and surrounded by a reference surface 242 inwardly offset by the selected distance $x$ for abutment with the upper surface of locking ring structure 208 in a parallel second reference plane spaced the selected distance $x$ above the first reference plane.

Figure 4A:
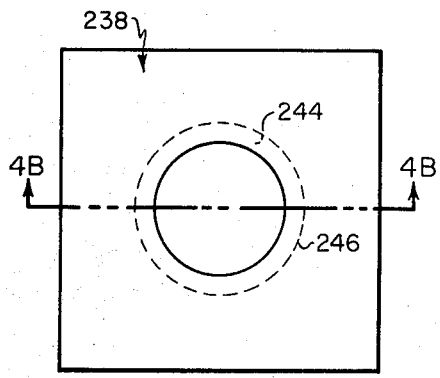
FIGS. 4A and B, 5A and B, 6A and B, and 7A and B are top and half-sectional side views of different calibrators that may be employed in the system of FIG. 1.
Figure 5A:
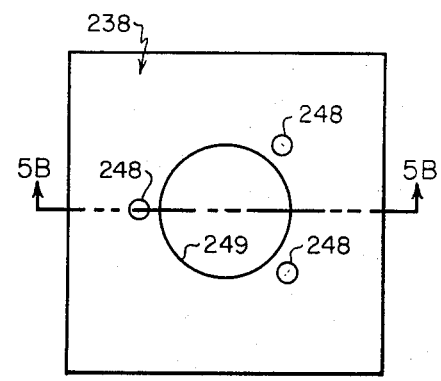
Figure 4B:
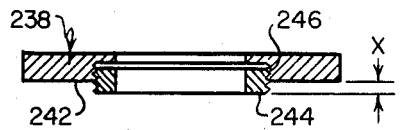
Figure 5B:
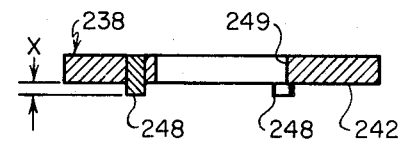
Figure 6A:
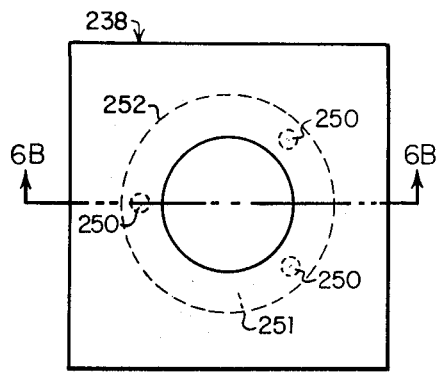
Figure 7A:
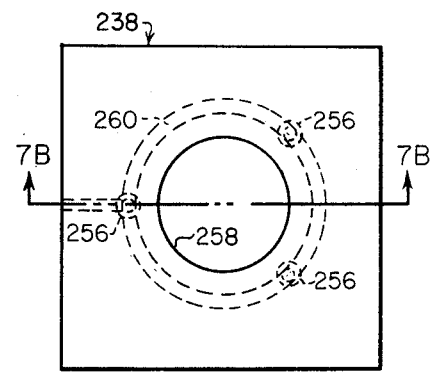
Figure 6B:
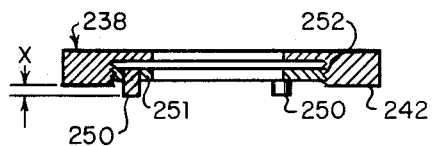
Figure 7B:
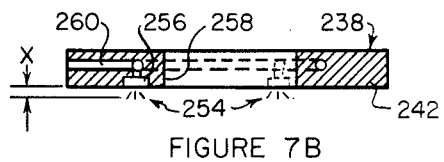

Spacing structure 240 of the calibrator comprises a fixed annular step the surface of which is parallel to and spaced the selected distance $x$ from reference surface 242. Alternatively, however, spacing structure 240 may comprise an adjustable annular step provided by screwing an externally-threaded ring 244 into a central internally-threaded aperture 246 of calibrator plate 238 as shown in FIGS. 4A and B; a plurality of pins 248 fixedly mounted at equally spaced positions around a central aperture 249 of calibrator plate 238 and spaced the selected distance $x$ from reference surface 242 as shown in FIGS. 5A and B; a plurality of pins 250 embedded in an externally-threaded ring 251 and adjustably mounted by screwing the externally-threaded ring 251 into an internally-threaded central aperture 252 of calibrator plate 238 as shown in FIGS. 6A and B; or an adjustable air cushion 254 provided by a plurality of spacing air jets 256 located at equally spaced positions around a central aperture 258 of calibrator plate 238 and connected by a passageway 260 and a control valve to a source of air pressure as shown in FIGS. 7A and B. One advantage of employing the adjustable annular step 244 of FIGS. 4A and B, the adjustably-mounted pins 250 of FIGS. 6A and B, or the adjustable air cushion 254 provided by spacing air jets 256 of FIGS. 7A and B as the spacing structure is that they all permit the operator to change the selected distance $x$ by which calibrator 238 spaces the upper surface of locking ring structure 208 above the upper surface of wafer 54 without the necessity of changing calibrators.

The reference surface 242 of calibrator 238 may also be made adjustable in lieu of, or in addition to, making the spacing structure 240 adjustable. For example, a plurality of reference air jets may be located at equally spaced positions around surface 242 of the calibrator shown in FIGS. 7A and B to provide an adjustable reference air cushion for abutment with the upper surface of locking ring structure 208 in the second reference plane. The air pressure applied to these air jets and, hence, this reference air cushion may then be adjusted to vary the selected distance $x$ by which calibrator 238 spaces the upper surface of locking ring structure 208 above the upper surface of wafer 54. Moreover, these reference air jets and the spacing air jets 256 may be connected to differential gauges for providing a readout of the selected distance $x$ by which calibrator 238 spaces the upper surface of locking ring structure 208 above the upper surface of wafer 54.

Calibrator 238 is supported for horizontal reciprocal movement between mask holder 12 and vacuum chuck 52 by a pair of guide rails 261 fixedly mounted on top plate 131. A piston rod 262 attached to a bifurcated bracket formed on the back end of calibrator 238 is driven by an operator-controlled fluid cylinder for moving the calibrator along guide rails 261 between an inoperative position completely retracted from the vertical path traversed by vacuum chuck 52 when it is elevated toward mask holder 12 and an operative position directly in this path and substantially in vertical alignment with the vacuum chuck and mask holder.

In the operation of optical alignment and exposure system 10, a mask 22 is loaded onto mask holder 12 while the mask holder is in its raised mask loading and unloading position and is firmly held in place thereon by drawing vacuum through tube 28. Mask holder 12 is then pivoted to its lowered operative position and firmly held in place upon top plate 18 by drawing vacuum through tube 34. A wafer 54 is loaded onto vacuum chuck 52 while the vacuum chuck is in its lowered wafer loading and unloading position and is firmly held in place thereon by drawing vacuum through tube 202.

Following these loading operations, calibrator 238 is moved into its operative position between vacuum chuck 52 and mask holder 12, if it is not already in that position. Vacuum chuck 52 is then driven upward by the first piston 120, which is in turn driven upward by applying fluid pressure to chamber 124 through tube 128, to position a peripheral portion of the upper surface of wafer 54 in face-to-face abutment upon spacing structure 240 of calibrator 238 in the first reference plane as shown in FIG. 8. This pivots vacuum chuck 52 as required to establish parallel plane alignment between the upper surface of wafer 54, the adjoining surface of spacing structure 240, and reference surface 242 of the calibrator. Locking ring structure 208 of the vacuum chuck is driven further upward by applying fluid pressure to the lower side of inflatable seal 226 through tube 232 to position the upper surface of the locking ring structure in abutment upon reference surface 242 of the calibrator in the parallel second reference plane as further shown in FIG. 8. This spaces the upper surface of locking ring structure 208 the selected distance $x$ above the upper surface of wafer 54 and pivots locking ring structure 208 as required, if, for example, the wafer is wedge-shaped, to establish parallel plane alignment of these surfaces. Locking ring structure 208 is then locked in this vertical position by applying fluid pressure to inflatable tube 214 through tube 216.

Following this calibration operation, vacuum chuck 52 is lowered to its initial wafer loading and unloading position or any intermediate position at which calibrator 238 may be retracted from between vacuum chuck 52 and mask holder 12. This is accomplished by venting tube 128 to the atmosphere or by drawing a vacuum therethrough to lower the first piston 120. Calibrator 238 is then retracted to its inoperative position out of the vertical path between vacuum chuck 52 and mask holder 12. At this point vacuum chuck 52 is driven upward again by the first piston 120, which is in turn driven upward by again applying fluid pressure to chamber 124 through tube 128, to position the upper surface of locking ring structure 208 in abutment upon a marginal unused portion of the lower surface of mask 22 as shown in FIG. 9. This again pivots vacuum chuck 52 as required to establish parallel plane alignment of the upper surface of wafer 54 and the lower surface of mask 22 and spaces these surfaces apart by the selected distance $x$ without bringing the wafer into contact with the mask. Vacuum chuck 52 is then locked in this vertical position by applying fluid pressure to inflatable tube 144 through tube 146 to lock the first piston 120 vertically in place.

Following this parallel plane alignment operation, locking ring structure 208 of vacuum chuck 52 is released by venting tube 216 to the atmosphere and is returned to its initial position by venting tube 232 to the atmosphere or by drawing a vacuum therethrough. A pattern on the upper surface of wafer 54 may then be aligned with a corresponding pattern on the adjacent parallel lower surface of mask 22 while the wafer and the mask are out of contact. This is accomplished with the aid of an optical unit 20 (see FIG. 10), like that described in detail in connection with FIGS. 1–10 of U.S. Pat. 3,490,846, by rotating a turret 264 of the optical unit to position a single field row and column or a split-field objective lens system 266 or 268, respectively, in operative alignment with stationary ocular lens system 85 of the microscope and by then horizontally moving vacuum chuck 52 relative to mask holder 12 while viewing the orientation of the patterns on mask 22 and wafer 54 through the aligned ocular and objective lens systems of the microscope.

Figure 10:
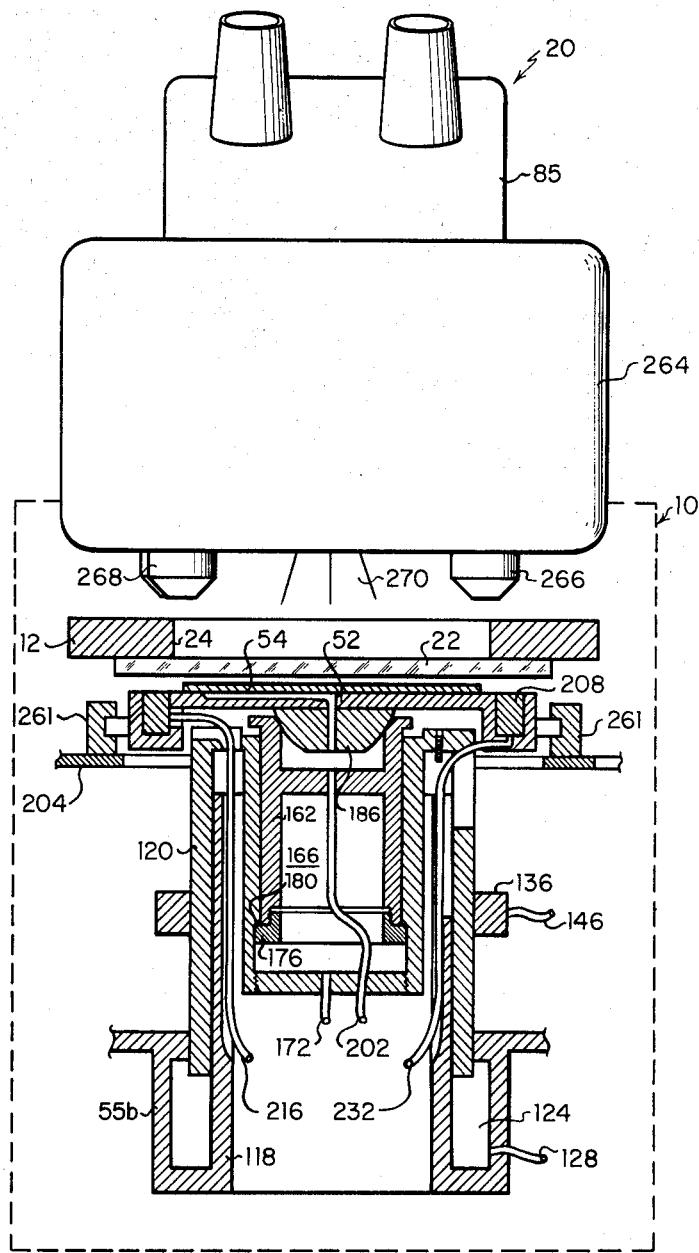
FIG. 10 is a simplified representation of the optical alignment and exposure system of FIG. 1, as viewed in a plane orthogonal to that of FIG. 1, when the chuck is in the exposure position.

After this pattern alignment operation, a photosensitive film on the upper surface of wafer 54 is exposed through mask 22 by rotating turret 264 of optical unit 20 to position a mirror for directing a beam of ultraviolet light 270 onto the mask as shown in FIG. 10. This exposure operation may be performed while wafer 54 is in its alignment position and, hence, without bringing the wafer into contact with the mask. For greater resolution, however, vacuum chuck 52 may first be driven upward by the second piston 162, which is in turn driven upward by applying fluid pressure to chamber 166 through tube 172, to position wafer 54 in an elevated position closer to mask 22 as shown in FIG. 10. Wafer 54 may be elevated to any position from its alignment position to, and including, the position of contact with the lower surface of mask 22 by adjusting the setting of stop ring 176 of the second piston.

Following the exposure operation, the first piston 120 is released and vacuum chuck 52 returned to its initial wafer loading and unloading position by venting tube 146 to the atmosphere to release the first piston 120 and by then venting tubes 128 and 172 to the atmosphere or by drawing a vacuum therethrough to lower the first and second pistons. Once vacuum chuck 52 is returned to its wafer loading and unloading position, tube 202 is also vented to the atmosphere so that wafer 54 may be unloaded from the vacuum chuck and replaced by the next wafer to be aligned with and exposed through mask 22.

Figure 11:
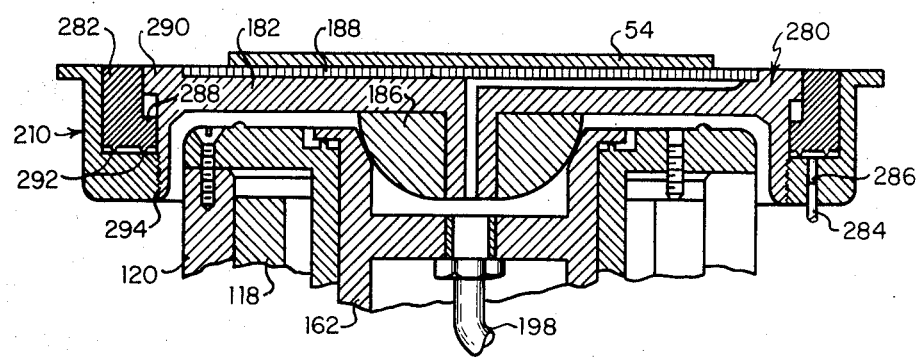
FIGS. 11 and 12 are half-sectional side views of another chuck that may be employed in the optical alignment and exposure system of FIG. 1 according to another of the preferred embodiments of this invention, when the chuck is in the wafer loading and unloading and the alignment positions, respectively.
Figure 12:
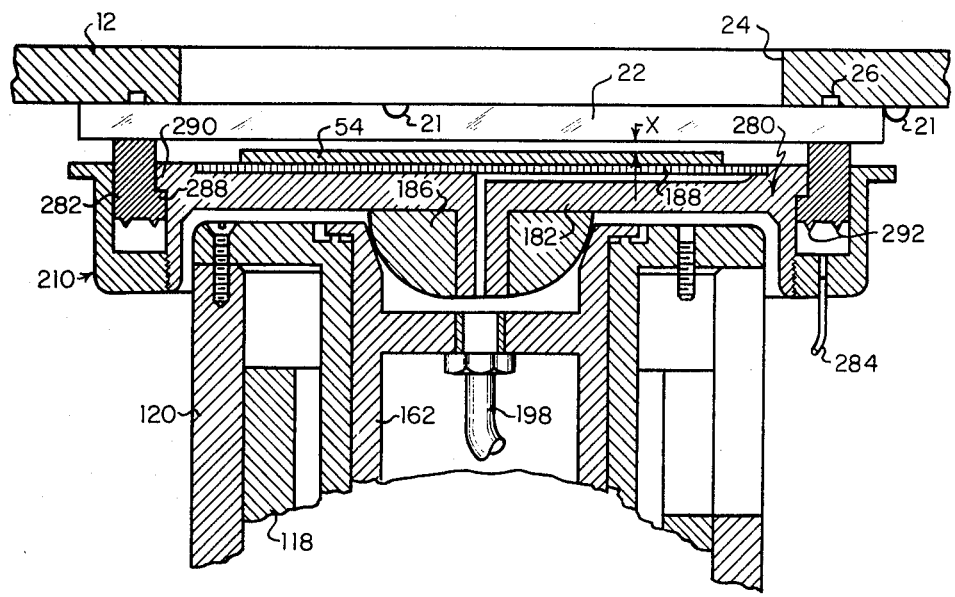

Referring now to FIGS. 11 and 12, there is shown another vacuum chuck 280 that may be employed in optical alignment and exposure system 10 of FIG. 1 in lieu of calibrator 238 and vacuum chuck 52 described above. Vacuum chuck 280 is best employed with wafers 54 having substantially parallel upper and lower surfaces. Those parts of vacuum chuck 280 which are similar or identical to corresponding parts of vacuum chuck 52 and which have therefore already been described in detail above are represented by the same reference numerals used in connection with FIG. 1.

Vacuum chuck 280 includes a spacing ring 282 vertically reciprocally mounted within a generally U-shaped peripheral portion 210 of chuck plate 182 around perforated top plate 188. Spacing ring 282 may be raised above the upper surface of a wafer 54 supported on perforated top plate 188 of vacuum chuck 280 by applying fluid pressure to the bottom of the spacing ring. Fluid pressure is applied from the source of fluid pressure to the bottom of spacing ring 282 through a control valve when opened by the operator, a flexible tube 284, and a passageway 286 that communicates with the bottom of the spacing ring. An inwardly-directed annular flange 288 of spacing ring 282 abuts upon an adjacent stop portion 290 of peripheral portion 210 of the chuck plate to prevent spacing ring 282 from travelling upward more than a selected distance $x$ above the upper surface of wafer 54 as shown in FIG. 12. Spacing ring 282 may be lowered under the action of gravity by actuating the control valve for tube 284 to disconnect tube 284 from the source of fluid pressure and instead vent it to the atmosphere. This control valve may also be actuated to connect tube 284 to the source of vacuum and thereby facilitate the lowering of spacing ring 282. A pair of annular ridges 292 concentrically formed on the bottom of spacing ring 282 abut upon the bottom of peripheral portion 210 of chuck plate 182 to prevent spacing ring 282 from travelling downward beyond a lowered inoperative position at which the upper surfaces of spacing ring 282, chuck plate 182, and perforated top plate 188 lie in the same horizontal plane. Annular ridges 292 serve to prevent any dust particles, which may collect on the bottom of peripheral portion 210, from interfering with return of spacing ring 282 to its lowered inoperative position.

The outer side and bottom walls of peripheral portion 210 of the chuck plate comprise a generally L-shaped annular ring internally threaded along the inner peripheral surface of the bottom wall and screwed into an externally threaded lower portion 294 of the inner side wall of peripheral portion 210. This facilitates the assembly of vacuum chuck 280 and permits the use of different spacing rings 282 in the same vacuum chuck to alter the selected distance $x$.

In operation, spacing ring 282 of vacuum chuck 280 is driven upward the selected distance $x$ above the upper surface of wafer 54 as determined by abutment of flange 288 of the spacing ring upon stop portion 290 of the chuck plate. This is accomplished by application of fluid pressure to tube 284. Vacuum chuck 280 is then driven upward by the first piston 120, as described above, to position spacing ring 282 in face-to-face abutment upon a marginal unused portion of the lower surface of mask 22 as shown in FIG. 12. This pivots vacuum chuck 280 as required to establish parallel plane alignment of the upper surface of wafer 54 and the adjacent lower surface of mask 22 and spaces these surfaces apart by the selected distance $x$ without bringing the wafer into contact with the mask. Vacuum chuck 280 is then locked in this vertical position by locking the first piston 120 vertically in place as described above. Following this parallel plane alignment operation, spacing ring 282 of the vacuum chuck is returned to its initial inoperative position by venting tube 284 to the atmosphere or by drawing a vacuum therethrough. The pattern alignment and exposure operations may then be performed in the same manner as described above.

Vacuum chuck 280 may also employ a spacing structure other than a fixed spacing ring 288. For example, it may employ an adjustable spacing ring provided by replacing the inwardly directed flange 288 of spacing ring 282 with an externally-threaded stop ring that is adjustably screwed into an internally-threaded lower portion of the spacing ring. Alternatively, it may employ air jets to provide an adjustable air cushion for abutment with a marginal portion of mask 22 in a plane parallel to and spaced a selected distance $x$ above the upper surface of wafer 54. In this case, the operator may alter the selected distance $x$ by adjusting the air pressure applied to the air jets.

As indicated above, the operator may turn shaft 160 to unscrew stop ring 150 by an amount sufficient to permit operation of optical alignment and exposure system 10 in the contact mode described in connection with FIG. 16 of U.S. Pat. 3,490,846. In this mode of operation a wafer 54 is brought into contact with a mask 22 to establish parallel plane alignment of the adjacent surfaces of the wafer and the mask, is then separated from the mask to permit out of contact alignment of a pattern on the wafer with a pattern on the mask, and is thereafter again brought into contact with the mask to permit exposure of a photosensitive film on the wafer through the mask. The wafer may be driven into contact with the mask both for parallel plane alignment and exposure by employing the first or main piston 120 in the same manner as described in connection with FIG. 16 of U.S. Pat. 3,490,846. In optical alignment and exposure system 10, however, the first or main piston 120 may be employed to drive the wafer into proximity with the mask and the second or auxiliary piston 162 employed to drive the wafer into actual contact with the mask more gently than can be achieved by employing the larger first or main piston. Alternatively, the first or main piston 120 may be employed to drive the wafer into contact with the mask for parallel plane alignment and, after out of contact pattern alignment, the second or auxiliary piston 162 employed for driving the wafer to any position from its pattern alignment position to the position of contact with the mask for exposure. In either case the second or auxiliary piston 162 permits a reduction in the number and/or force of the contacts between the wafer and the mask.

I claim:

1. Alignment apparatus for use in aligning a first element with respect to a second element, said apparatus comprising:
    first means for holding the first element;
    second means for holding the second element; and
    third means for orienting a first surface of the first element and an adjacent first surface of the second element in substantially parallel planes spaced a finite distance apart without bringing the first element into contact with the second element.

2. Alignment apparatus as in claim 1 wherein said third means is movable between a retracted position and an extended position.

3. Alignment apparatus as in claim 1 wherein said third means is supported by one of the first and second means.

4. Alignment apparatus as in claim 3 wherein:
    said first means comprises chuck means for holding a workpiece comprising the first element;
    said second means comprises holder means for holding a mask comprising the second element; and
    said chuck means is supported for pivotal movement to orient the adjacent first surfaces of the workpiece and the mask in substantially parallel planes and for movement between a retracted position at which the workpiece may be loaded onto and unloaded from the chuck means and an extended position at which the third means may be employed for pivoting the chuck means to orient the first surfaces of the workpiece and the mask in substantially parallel planes without bringing the workpiece into contact with the mask.

5. Alignment apparatus as in claim 4 wherein said third means comprises spacing means supported by the chuck means around the workpiece for movement between a retracted position spaced at least as far as the workpiece bearing surface of the chuck means from the first surface of the mask and an extended position spaced closer than the first surface of the workpiece to the first surface of the mask.

6. Alignment apparatus as in claim 5 including calibrating means for spacing a first surface of the spacing means and the first surface of the workpiece a finite distance apart in substantially parallel planes with the first surface of the spacing means being spaced closer than the first surface of the workpiece to the first surface of the mask.

7. Alignment apparatus as in claim 6 wherein said calibrating means is movable to an operative position be-between the chuck means and the holder means and an inoperative position retracted from between the chuck means and the holder means, said calibrating means being operable in its operative position for spacing the first surfaces of the spacing means and the workpiece the finite distance apart in substantially parallel planes when the chuck means is moved to an intermediate position between its retracted and extended positions and the spacing means is moved to its extended position.

8. Alignment apparatus as in claim 7 wherein said spacing means may be releasably locked in place relative to the chuck means when the first surfaces of the spacing means and the workpiece are spaced the finite distance apart in substantially parallel planes by the calibrating means, said chuck means may then be moved from its intermediate position toward its retracted position to permit movement of the calibrating means to its inoperative position, said chuck means may thereupon be moved to its extended position at which the spacing means is operable for pivoting the chuck means to orient the first surfaces of the workpiece and mask in substantially parallel planes spaced the finite distance apart without bringing the workpiece into contact with the mask, and said spacing means may then be released and moved to its retracted position to permit out of contact alignment of a pattern on the first surface of the workpiece with a pattern on the first surface of the mask.

9. Alignment apparatus as in claim 8 wherein said calibrating means comprises:
first means for abutment with a peripheral portion of the first surface of the workpiece in a first reference plane when the chuck means is moved to its intermediate position; and
second means for abutment with the first surface of the spacing means in a substantially parallel second reference plane when the spacing means is moved to its extended position, said first and second reference planes being spaced the finite distance apart with the second reference plane being spaced closer than the first reference plane to the first surface of the mask.

10. Alignment apparatus as in claim 9 wherein said first and second means are operable for spacing the first surfaces of the spacing means and the workpiece apart by a finite distance in the range from .0002 to .002 of an inch.

11. Alignment apparatus as in claim 9 wherein at least one of said first and second means is adjustable for varying the finite distance by which the calibrating means spaces the first surfaces of the spacing means and the workpiece apart.

12. Alignment apparatus as in claim 9 wherein:
said first means comprises an annular step having a plane surface for abutment with the peripheral portion of the first surface of the workpiece in the first reference plane; and
said second means comprises a parallel plane surface positioned around this annular step and inwardly offset by the finite distance for abutment with the first surface of the spacing means in the second reference plane.

13. Aligment apparatus as in claim 9 wherein:
said first means comprises a plurality of spaced pins for abutment with the peripheral portion of the first surface of the workpiece in the first reference plane; and
said second means comprises a plane surface positioned around these pins and inwardly offset by the finite distance for abutment with the first surface of the spacing means in the second reference plane.

14. Alignment apparatus as in claim 9 wherein:
said first means comprises an air cushion for abutment with the peripheral portion of the first surface of the workpiece in the first reference plane; and
said second means comprises a plane surface positioned around this air cushion and inwardly offset by the finite distance for abutment with the first surface of the spacing means in the second reference plane.

15. Alignment apparatus as in claim 9 wherein:
said first means comprises a first air cushion for abutment with the peripheral portion of the first surface of the workpiece in the first reference plane;
said second means comprises a second air cushion positioned around this first air cushion and inwardly offset by the finite distance for abutment with the first surface of the spacing means in the second reference plane; and
said alignment apparatus includes means for adjusting the offset between these first and second air cushions and providing an output indication of the finite distance by which the calibrating means spaces the first surfaces of the spacing means and the workpiece apart.

16. Alignment apparatus as in claim 9 wherein at least one of said first and second means includes a plurality of spaced air jets for providing an air cushion for abutment with one of the first surface of the workpiece and the first surface of the spacing means in one of the first and second reference planes.

17. Alignment apparatus as in claim 9 wherein said spacing means comprises:
a hollow locking ring structure with an inwardly curved bottom wall that may be forced outward by an inflatable tube contained within the hollow locking ring structure to expand the locking ring structure into locking engagement with a peripheral portion of the chuck means when the first surfaces of the spacing means and the workpiece are spaced the finite distance apart by the calibrating means; and
means for moving the locking ring structure between the retracted and extended positions of the spacing means.

18. Alignment apparatus as in claim 17 wherein:
said holder means comprises a mask holder for holding the mask;
said chuck means comprises a wafer chuck for holding a semiconductive wafer comprising the workpiece, said wafer chuck being supported beneath the mask holder;
piston means is provided for moving the wafer chuck between its retracted and extended positions;
optical means is provided for viewing the mask and the wafer held by the mask holder and the wafer chuck;
means is provided for relatively moving the wafer chuck and the mask holder to bring a pattern on the wafer into alignment with a pattern on the mask; and
means is provided for exposing a photosensitive film on the first surface of the wafer through the mask while the wafer chuck is positioned at or between its extended position and a position at which the first surface of the wafer contacts the adjacent first surface of the mask.

19. Alignment apparatus as in claim 18 wherein said piston means comprises:
a first piston for moving the wafer chuck between its retracted and extended positions; and
a second piston for moving the wafer chuck between its extended position and a position closer to the first surface of the mask when the wafer chuck is moved to its extended position by the first piston.

20. Alignment apparatus as in claim 5 wherein said spacing means includes a hollow locking ring structure with an inwardly curved bottom wall that may be forced outward to expand the locking ring structure into locking engagement with the chuck means when the spacing means is moved to its extended position.

21. Alignment apparatus as in claim 20 wherein:
said locking ring structure comprises a hollow generally U-shaped locking ring with its side and inwardly curved bottom walls being slotted to make them expandable, with an annular inflatable tube contained therein for forcing its inwardly curved bottom wall outward to expand its side walls into locking engagement with a peripheral portion of the chuck means, and with a ring attached to its upper end and provided with a plane surface comprising a first surface of the locking ring structure; and
said spacing means further includes an annular inflatable seal attached to a bottom wall of the peripheral portion of the chuck means and to the inwardly curved bottom wall of the locking ring for moving the locking ring structure between the retracted and extended positions of the spacing means.

22. Alignment apparatus as in claim 21 wherein said locking ring structure is supported for pivotal movement to permit face-to-face abutment of the first surface of the locking ring structure and a reference surface making a slight angle relative to the workpiece bearing surface of the chuck means.

23. Alignment apparatus as in claim 5 including:
first piston means for moving the chuck means between its retracted and extended positions; and
second piston means for moving the chuck means between its extended position and a position closer to the first surface of the mask.

24. Alignment apparatus as in claim 23 wherein:
said chuck means is pivotally supported by the second piston means;
said second piston means is coaxially supported by the first piston means and is provided with first stop means for engaging a first stop portion of the first piston mean to limit the distance the chuck means may be moved toward the first surface of the mask by the second piston means;
said first piston means is operable for moving both the second piston means and the chuck means between the retracted and extended positions of the chuck means;
said alignment apparatus includes releasable locking means for locking the first piston means in whateven vertical position it may be in; and
said first and second piston means include second stop means for preventing the chuck means from being moved further than its retracted position away from the first surface of the mask.

25. Alignment apparatus as in claim 24 wherein the first stop means of the second piston means is adjustable to permit movement of the chuck means to any position from its extended position to a position closer to the first surface of the mask when the chuck means is moved to its extended position by the first piston means.

26. Alignment apparatus as in claim 5 wherein said spacing means comprises a spacing structure supported by a peripheral portion of the chuck means and provided with stop means for engaging a stop portion of the peripheral portion of the chuck means to limit the distance the spacing means may be moved between its retracted and extended positions.

27. Alignment apparatus as in claim 26 wherein:
said spacing structure comprises a spacing ring with a plane first surface for abutment upon a marginal portion of the first surface of the mask when the spacing structure and the chuck means are moved to their extended positions;
said stop means of the spacing structure comprises an annular stop portion of the spacing ring positioned for abutment with the stop portion of the peripheral portion of the chuck means when the spacing ring is in its extended position; and
said peripheral portion of the chuck means includes means for moving the spacing ring between its retracted and extended positions.

28. Alignment apparatus as in claim 27 wherein said stop portions of the spacing ring and the chuck means limit movement of the spacing ring between its retracted and extended positions to a distance in the range from .0002 to .002 of an inch.

29. Alignment apparatus as in claim 27 wherein:
said holder means comprises a mask holder for holding the mask;
said chuck means comprises a wafer chuck for holding a semiconductive wafer comprising the workpiece, said wafer chuck being supported beneath the mask holder;
piston means is provided for moving the wafer chuck between its retracted and extended positions;
optical means is provided for viewing the mask and the wafer held by the mask holder and the wafer chuck;
means is provided for relatively moving the wafer chuck and the mask holder to bring a pattern on the wafer into alignment with a pattern on the mask; and
means is provided for exposing a photosensitive film on the first surface of the wafer through the mask while the wafer chuck is positioned at or between its extended position and a position at which the first surface of the wafer contacts the adjacent first surface of the mask.

30. Alignment apparatus as in claim 29 wherein said piston means comprises:
a first piston for moving the wafer chuck between its retracted and extended positions; and
a second piston for moving the wafer chuck between its extended position and a position closer to the first surface of the mask when the wafer chuck is moved to its extended position by the first piston.

31. Alignment apparatus for use in aligning a first element with respect to a second element, said apparatus comprising:
first means for holding the first element;
second means for holding the second element;
third means for driving the first means between a retracted position and an intermediate position closer to the second means; and
fourth means for driving the first means between the intermediate position and an extended position still closer to the second means when the first means is moved to the intermediate position by the third means.

32. Alignment apparatus as in claim 31 wherein:
said first means comprises a chuck for holding a semiconductive wafer comprising the first element;
said second means comprises a holder for holding a mask comprising the second element;
said third means comprises a first piston for driving the wafer chuck between the retracted and intermediate positions;
said fourth means comprises a second piston coaxially supported by the first piston for driving the wafer chuck between the intermediate and extended positions;
optical means is provided for viewing the mask and the wafer held by the mask holder and the wafer chuck;
means is provided for relatively moving the wafer chuck and the mask holder to bring a pattern on the wafer into alignment with a pattern on the mask; and
means is provided for exposing a photosensitive film on the first surface of the wafer through the mask while the wafer chuck is positioned at or between the intermediate and extended positions by the second piston.

33. Alignment apparatus as in claim 32 wherein:
said wafer chuck is pivotally supported by the second piston;
said second piston is supported by the first piston and provided with first stop means for engaging a first stop portion of the first piston to limit the distance the wafer chuck may be driven between the intermediate and extended positions by the second piston;
said first piston is operable for driving both the second piston and the wafer chuck between the retracted and extended positions;
said alignment apparatus includes releasable locking means for locking the first piston in the intermediate position; and
said first and second pistons include second stop means for preventing the wafer chuck from being moved further than the retracted position away from the mask.

34. Alignment apparatus as in claim 33 wherein the first stop means of the second piston is adjustable so that the wafer chuck may be driven by the second piston to any position from the intermediate position to an extended position at which the wafer and the mask are brought into contact.

35. A locking ring structure comprising:
a hollow generally U-shaped locking ring with a pair of oppositely-facing side walls and an inwardly curved bottom wall, said side and inwardly curved bottom walls being slotted to make them expandable;

said locking ring structure including an annular inflatable tube captivated within the locking ring for forcing the inwardly curved bottom wall of the locking ring outward to expand the side walls of the locking ring into locking engagement with an adjacent structure; and said inwardly curved bottom wall of the locking ring is formed so that when the inflatable tube being inflated the inwardly curved bottom wall forces the side walls of the locking ring outward against the adjacent structure with a greater force than that exerted on the inwardly curved bottom wall by the inflatable tube.

References Cited

UNITED STATES PATENTS

| | | | |
|---|---|---|---|
| 3,220,331 | 11/1965 | Evans et al. | 355—78 |
| 3,490,846 | 1/1970 | Kasper | 355—78 |
| 3,355,829 | 12/1967 | Butterbaugh | 355—92 X |

OTHER REFERENCES

IBM Technical Disclosure Bulletin, "Contact Copy Platen With Transparent Membrane," Hildebrand, vol. 8, No. 12, May 1966, p. 1786.

SAMUEL S. MATTHEWS, Primary Examiner

R. A. WINTERCORN, Assistant Examiner

U.S. Cl. X.R.

355—92